Oct. 13, 1925.
P. G. FRAZIER
1,557,245
ROTARY VALVE STRUCTURE FOR ENGINES
Filed Nov. 16, 1921 2 Sheets-Sheet 1
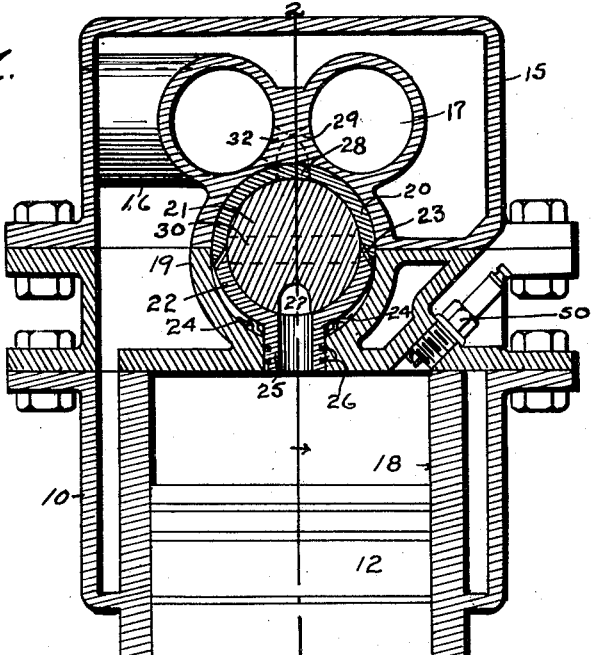
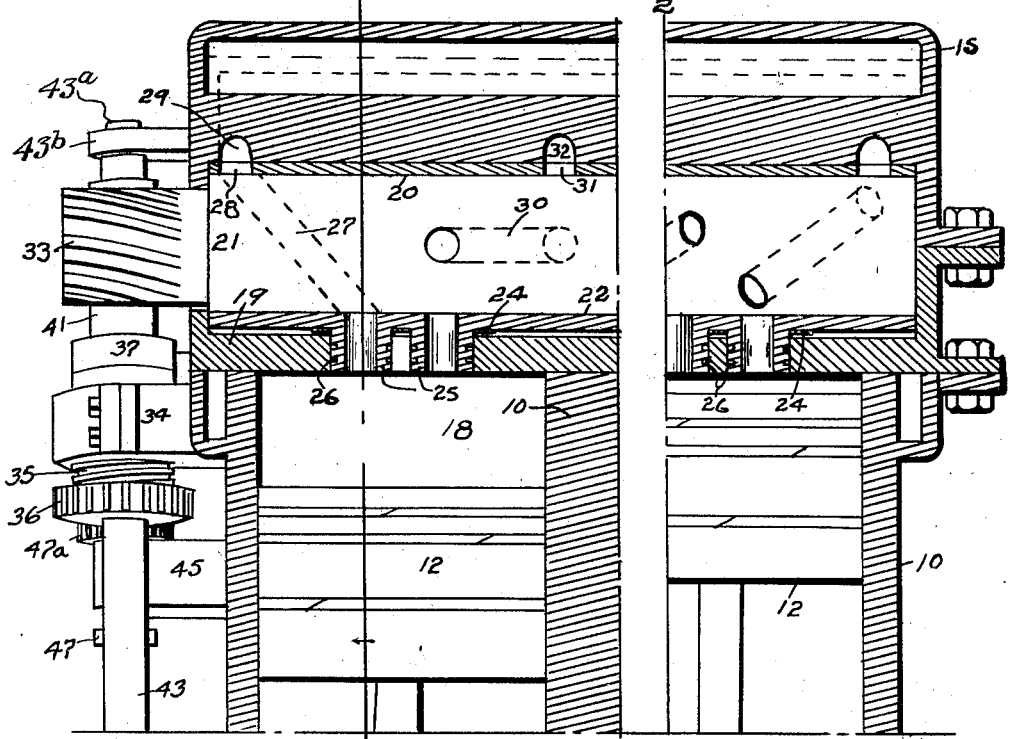

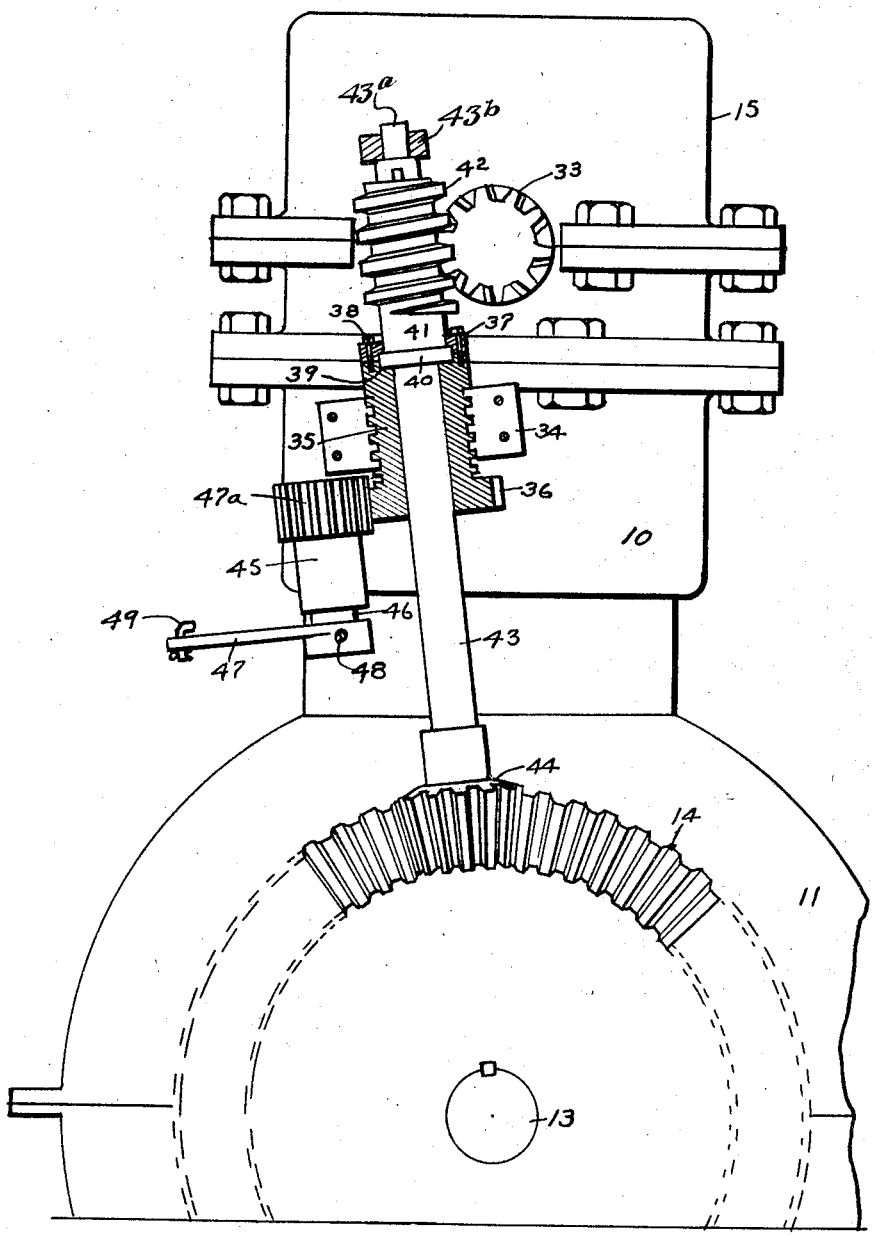

Patented Oct. 13, 1925.

1,557,245

UNITED STATES PATENT OFFICE.

PEARL G. FRAZIER, OF ANKENY, IOWA.

ROTARY VALVE STRUCTURE FOR ENGINES.

Application filed November 16, 1921. Serial No. 515,548.

*To all whom it may concern:*

Be it known that I, PEARL G. FRAZIER, a citizen of the United States, and a resident of Ankeny, in the county of Polk and State of Iowa, have invented a certain new and useful Rotary Valve Structure for Engines, of which the following is a specification.

The object of my invention is to provide a rotary valve structure of comparatively simple, durable and inexpensive construction, peculiarly adapted for use with internal combustion and other engines.

More particularly, it is my object to provide in a rotary valve structure a journal or bearing for the rotary valve yieldingly mounted to snugly engage the valve at all times and yet to allow for contraction and expansion of the valve.

Still a further object is to provide simple and effective means, whereby the action of the valve may be retarded or advanced with relation to the movement of the pistons.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 shows a transverse, vertical, sectional view through an engine equipped with a rotary valve structure embodying my invention.

Figure 2 shows a longitudinal, vertical, sectional view through the same; and

Figure 3 shows a front elevation of the engine and the valve operating mechanism.

In the drawings herewith, I have used the reference numeral 10 to indicate generally the block or body of an internal combustion engine, having the crank case 11. The engine has the pistons 12 and the crank shaft 13, on which is a beveled gear 14 from which the rotary valve is operated.

The engine has a removable head 15. In the head 15 is the intake fuel supply chamber 16 and the exhaust gas chamber 17.

It will, of course, be understood that the engine may have one or more cylinders and that the fuel and exhaust chambers are of suitable length depending upon the number of cylinders.

The chambers 16 and 17 in the form of my invention illustrated herein are arranged substantially side by side above the rotary valve, which will now be described.

The pistons 12 are located in the cylinders 18.

In the particular form of my invention shown herein, I have illustrated the cylinders arranged in a row. Above the row of cylinders and formed on the engine block and head is a valve casing 19. In the upper half of the valve casing 19 is a journal or bearing 20, which is arranged to form a bearing for the other half of a rotary valve comprising the shaft or the like 21, constructed as is hereinafter more fully explained.

The journal or bearing 22 is provided to form a bearing for the lower half of the rotary valve 21. The adjacent edges of the bearings 20 and 22, as indicated for instance at 23, are inclined from their upper portions downwardly and outwardly, as shown in Figure 1, for purposes, which will be hereinafter more fully explained.

It will be understood that the inside of the bearing 22 fits the rotary valve 21. The valve casing 19 is of such shape as to allow limited up and down movement of the bearing 22. Arranged between the bearing 22 and the lower part of the valve casing 19 is a series of springs 24. As many of the springs 24 may be provided as is considered desirable under the circumstances. The springs 24 yieldingly hold the bearing 22 snugly against the rotary valve 21 and the space between the bearing 22 and the lower part of the casing 19 is designed to receive a suitable lubricant.

The bearing 22 has above each cylinder 18 a pair of downwardly extending tubular, cylindrical extensions 25, whereby communication is afforded between the valve chamber and the cylinder. These cylindrical extensions 25 are provided on their exterior with ordinary expansion rings, ordinarily called piston rings 26, and said extensions slide in suitable openings and serve as guides for the adjustable movement of the bearing 22.

The rotary valve 21 has certain passages through it suitably arranged for each cylinder.

I will now describe the passages for the front cylinder, and it will be understood that the others are correspondingly arranged for the proper supplying of fuel and conducting away of exhaust gases at the proper times during the operation of the engine.

For the first cylinder, the valve 21 is provided with a passage 27, shown by dotted lines in Figure 2, inclined longitudinally from the vertical in the valve. The passage 27 is arranged so that in one position of the valve 21, the lower end of the passage 27 registers with the opening of the forward cylindrical extension 25, as shown for instance in Figure 2, and at the same time, the upper end of the passage 27 registers with a hole 28 in the upper bearing 20 and with a passage 29 leading to the exhaust chamber 17.

The passage 27 is the passage for exhaust gases. A quarter way around the valve 21 from the passage 27 is the intake passage 30 extending through the valve and inclined from the vertical. The passage 30 is so arranged that in one position of the valve 21, one end of said passage registers with the opening in the other extension 25 above the front cylinder, while the opposite end of the passage 30 then registers with a hole 31 in the upper bearing 20 and with a passage 32 leading to the fuel chamber 16.

It will be understood that the passages 30 and 27 are so arranged that the passage 30 is open during the intake stroke and that thereafter the valve rotates through the compression and explosion strokes of the piston and then the passage 27 is open during the exhaust stroke of the piston.

I have not tried in my drawings to show the exact proper proportionate size of the various passages and cylinders, and it will be understood that the passages are of such size as to permit the proper supply of fuel and proper escape of the exhaust gases.

For operating the rotary valve 21, I have provided the gear 14, already shown, and additional mechanism which will now be described.

On the forward end of the valve 21 is a worm wheel 33, shown in Figures 2 and 3. At the front of the engine block is arranged a tubular boxing or bearing 34, which is internally screw-threaded to receive a sleeve 35. The sleeve 35 has at one end a pinion 36, shown in Figure 3, and is screw-threaded preferably for the rest of its length on its exterior to be received in and coact with the screw-threaded interior of the boxing or bearing 34. The sleeve 35 is provided at its upper end with a removable head 37, which is connected with the body of the sleeve by means of screw bolts 38 or the like.

The upper end portions of the sleeve 35 and the head 37 are provided on their interior with an annular groove 39, which receives a collar 40 on a hollow shaft 41 on which is formed a worm 42.

Slidably and rotatably mounted in the sleeve 35 is a shaft 43 on one end of which is a beveled gear 44 arranged in mesh with the gear 14. The upper end of the shaft 43 is reduced as at 43$^a$ and is received in a thrust bearing 43$^b$ which retains the gears 14 and 44 in mesh. The hollow worm shaft 41 is keyed or feathered to the shaft 43 to permit the hollow shaft 41 to slide on the shaft 43, but to prevent relative rotation of said shafts.

On the engine block 10 is a bearing 45, in which is mounted a shaft 46. On one end of the shaft 46 is a relative wide-faced pinion 47$^a$ arranged in mesh with the pinion 36. On the other end of the shaft 46 an arm 47 is adjustably fixed by means of a set screw 48.

The arm 47 is designed to be pivoted to a rod or the like, which rod may extend through the dash for convenience of operation from the driver's seat. The rod is indicated by the reference character 49.

I will now describe the operation of my improved rotary valve.

It will be understood that when the engine is run the gear 14 will be operated from the crank shaft 13. The gear 14 will rotate the gear 44 and the shaft 43. The rotation of the shaft 43 imparts rotation to the shaft 41 and the worm 42 and thence to the worm wheel 33 and the rotary valve 21. As the rotary valve rotates, the passage 30 comes to such position that it registers with one of the tubular extensions 25 and with the opening 32, thus opening the valve and permitting the fuel mixture to move from the chamber 16 through the passage 32, the opening 31, the passage 30 and the extension 25 and into the front cylinder during the downward stroke of the piston 12.

The shaft is, of course, timed so that the passage 30 moves away from the extension 25 at the proper time during the crank shaft and piston operation.

The charge is fired in proper sequence by means of a spark plug 50. An explosion occurs; the piston is driven downward, and on its return, the passage 27 moves to open position and the exhaust gases are driven out through the other extension 25, the passage 27, the opening 28, the passage 29 and the chamber 17.

It will be seen that the passages 30 and 37 are inclined so that there is one exhaust and one intake on each full revolution of the shaft for each cylinder.

It will be understood that in the form in which my invention is illustrated here, it is designed for a four-cycle engine. It will be noted also that the exhaust passages through the valve are so inclined as to permit them to be scoured by the exhaust and thus to be cleaned.

On account of the construction of the valve, it will be seen that no carbon can gather at any point where it would tend to make the valve stick.

With valves of this general type, one great problem that has arisen has been due to the difficulty of providing or allowing for expansion or contraction. This problem I have solved by providing the adjustable lower bearing 22, which can move downwardly as the valve expands, without in any way interfering with the operation of the engine or the valve.

The springs 24 will hold the bearing 22 snugly against the valve in all conditions of its expansion or contraction. Suitable means for lubrication not here shown are provided in the complete machine.

It will be noted that the construction of the extensions 25 with the expansion rings thereon not only furnishes suitable guides, whereby the lower bearing 22 is always properly supported and positioned, but also provides a tight joint to prevent the escape of gases into the valve casing. Thus there is provided for the valve, proper bearings snugly fitting at all times and yet allowing for expansion and contraction.

It will be noted that the edges of the upper and lower bearings 20 and 22 are inclined, as hereinbefore described, so that little oil or lubricant will travel from the valve casing through the bearings to the valve.

Even if the engine should stop with one of the passages registering with the joints between the bearing members, no oil would travel into the passages, but oil would follow the inclined edges of the bearings and run down into the lower part of the casing.

The rings on the extensions 25 will also keep the oil out of the cylinder.

I have embodied in my construction herein illustrated, another feature, which I consider to be one of the most important parts of my invention, to-wit: the means for adjusting the valve, so as to vary its position somewhat with relation to the positions of the pistons and the crank shaft.

It will be seen that while the valve is operated through the mechanism hereinbefore described from the crank shaft and is thus always in time with the crank shaft, I have provided additional mechanism, whereby the valve may be adjusted to a sufficient extent for all desired purposes.

By manipulating the rod 49, the shaft 46 is rotated for imparting rotation to the wide gear 47. This imparts rotation to the gear 36 and the sleeve 35. On account of the screw-threaded connection between the sleeve 35 and the bearing 34, rotation of the sleeve 35 will also cause a longitudinal movement of the sleeve 35 and the worm 42 connected therewith by means of the collar 40. This will cause the valve shaft to be advanced or retarded as may be desired.

This is particularly important after the engine has been warmed up and is running at a high rate of speed, because it makes it possible to furnish the charge to the engine cylinders and to permit discharge of exhaust gases therefrom a little earlier in each operation of the engine.

In ordinary engines, the speed is usually limited by the fact that the valve action is timed in relation to the piston and crank shaft movement and can not be varied from such relation.

After the ordinary engine with the ordinary valve equipment reaches a certain speed, it can not go higher, because the valves can not operate earlier in time with relation to the piston movement and can not supply the fuel early enough to increase the speed.

With my adjustable structure, it will be seen that the fuel charge may be supplied earlier or later, as may be desired with relation to the piston movement. The same thing, of course, is true in regard to the opening of the exhaust passages to the valve.

The structure herein shown for controlling the adjustment of the valve is illustrative and may be changed if desired to other structures convenient for accomplishing the purpose.

It will thus be seen that I have provided a rotary valve, which does away with the difficulties involved where reciprocating valves are employed. Where a rotary valve is used, it is obvious that greater speed may be secured, so far as valve action is concerned.

Rotary movement involves less wear on the parts and less likelihood of getting out of time, as well as less likelihood of sticking, than does a construction embodying a reciprocating valve.

Obviously the rotary valve involves less vibration than the reciprocating valve.

With a rotary valve structure, there is no possibility of one valve getting out of time with relation to the other valves, and there is no danger of having one valve stick. The necessity for frequent valve grinding is done away with.

It will be noted that the operation of the worm and the adjustment thereof are always such that any pressure on the valve is upward rather than downward against the adjustable bearing.

While I have referred to my valve and to the possibilities of its use with internal combustion engines, I do not want to be understood as confining myself to this particular type of engine for the reason that I believe it can be adapted to steam engines and other engines as well.

Some changes may be made in the construction and arrangement of the various parts of my improved rotary valve without departing from the real spirit and purpose of my invention, and it is my intention to cover by my claim, any modified forms of structure, or use of mechanical equivalents, which may be reasonably included within its scope.

I claim as my invention:

The combination with an engine having an operative mechanism including cylinders and pistons and crank shaft with a rotary valve structure, comprising a rotary valve having an inclined passage for each cylinder, a worm wheel on the end of the valve, a worm in mesh therewith, a shaft on which said worm wheel is mounted, an exteriorly threaded sleeve nonslidably and rotatably mounted on the shaft, an interiorly threaded bearing receiving the sleeve, controlling means for rotating the sleeve for moving the shaft longitudinally and thus varying the register of the worm with the worm wheel, the shaft being operatively connected with the crankshaft.

Des Moines, Iowa, November 9, 1921.

PEARL G. FRAZIER.